US007420828B2

(12) United States Patent
Ishio et al.

(10) Patent No.: US 7,420,828 B2
(45) Date of Patent: Sep. 2, 2008

(54) INDUCTION HEATING APPARATUS

(75) Inventors: Yoshiaki Ishio, Hyogo (JP); Hiroshi Tominaga, Hyogo (JP); Hideki Sadakata, Osaka (JP); Izuo Hirota, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/658,889

(22) PCT Filed: Jun. 2, 2006

(86) PCT No.: PCT/JP2006/311094

§ 371 (c)(1),
(2), (4) Date: Mar. 15, 2007

(87) PCT Pub. No.: WO2006/129795

PCT Pub. Date: Dec. 7, 2006

(65) Prior Publication Data

US 2008/0049470 A1 Feb. 28, 2008

(30) Foreign Application Priority Data

Jun. 2, 2005 (JP) ............................. 2005-162264
Jun. 17, 2005 (JP) ............................. 2005-177238

(51) Int. Cl.
*H02M 3/24* (2006.01)
*G05F 1/40* (2006.01)

(52) U.S. Cl. .......................... 363/98; 219/663; 323/285

(58) Field of Classification Search ................... 363/75, 363/79, 97, 98, 132; 323/224, 225, 284, 323/285; 219/663, 664, 665, 490
See application file for complete search history.

(56) References Cited

U.S. PATENT DOCUMENTS 5,650,925 A * 7/1997 Hesterman ................... 363/98
5,998,930 A * 12/1999 Upadhyay et al. ........... 315/106
6,274,987 B1 * 8/2001 Burke ......................... 315/307
7,015,652 B2 * 3/2006 Shi ............................ 315/224
7,221,121 B2 * 5/2007 Skaug et al. ................ 318/807

FOREIGN PATENT DOCUMENTS

JP 1-246783 10/1989
JP 8-111975 4/1996
JP 2003-151749 5/2003
JP 2003-151753 5/2003
JP 2003-257609 9/2003
JP 2005-116385 4/2005

OTHER PUBLICATIONS

Patent Cooperation Treaty (PCT) International Preliminary Report on Patentability, issued Dec. 6, 2007 in International Application No. PCT/JP2006/311094.

* cited by examiner

*Primary Examiner*—Jessica Han
(74) *Attorney, Agent, or Firm*—Wenderoth, Lind & Ponack, L.L.P.

(57) ABSTRACT

The present invention provides an induction heating apparatus that can detect that a power factor correction circuit is in operation or in non-operation. The induction heating apparatus includes a power factor correction circuit that corrects a power factor of an inputted direct-current power supply by turning on and off a switching element connected to a choke coil, a booster circuit that boosts an output voltage of the power factor correction circuit by turning on and off a switching element connected to a choke coil, an inverter circuit that inputs the output voltage of the booster circuit to generate a high-frequency current in a heating coil by turning on and off a switching element, and an inverter circuit drive control unit that, in driving the power factor correction circuit, controls output of the inverter circuit such that an input current reaches a target value and detects the voltage in the booster circuit. The inverter circuit drive control unit stops the output of the inverter circuit when it is detected that the power factor correction circuit is in non-operation.

15 Claims, 2 Drawing Sheets

INDUCTION HEATING APPARATUS

TECHNICAL FIELD

The present invention relates to an induction heating apparatus used in a home, an office, a restaurant, a plant, and the like, such as an induction heating cooking device which uses electromagnetic induction for induction heating a cookware.

BACKGROUND ART

Conventionally, there is an induction heating apparatus which have a booster circuit and an inverter circuit to supply high-frequency power to a load through a heating coil (for example, see the patent document 1).

There is also known a technique of suppressing a harmonic current by incorporating a power factor correction circuit (PFC) and the inverter circuit into the induction heating apparatus (for example, see the patent document 2).

Patent Document 1: JP-A-2003-257609

Patent Document 2: JP-A-1-246783

DISCLOSURE OF INVENTION

Problem to be Solved by the Invention

In the conventional induction heating apparatus, the power factor correction circuit corrects a power factor of input power, and the inverter circuit converts the input power outputted from the power factor correction circuit into predetermined high-frequency power. In the conventional induction heating apparatus, when the operation of only the power factor correction circuit is stopped, an input current waveform of the inverter circuit becomes an acute current waveform which is specific to a capacitor-input type power supply, and the power factor is remarkably decreased. Even in such cases, in the conventional induction heating apparatus in which the inverter circuit and the power factor correction circuit are separately controlled, because an input current becomes a target value in the inverter circuit, it cannot be judged on the inverter circuit side whether or not the power factor correction circuit is operated, and the inverter circuit is continuously operated. However, in this case, a correlation between the input current and power consumption is shifted because of the acute input current waveform, and the target output power can not be obtained from the inverter circuit. That is, the inverter circuit continuously operates while the power factor is decreased. Thus, in the case where the power factor correction circuit is stopped, the conventional induction heating apparatus has a problem that the inverter circuit continuously operates although the power factor is decreased.

The present invention is provided for solving the above problem, and an object of the invention is to provide an induction heating apparatus which can detect that the power factor correction circuit is in operation or non-operation with a circuit unit except for the power factor correction circuit in order to prevent the continuation of the heating while the power factor remains largely decreased.

Means to Solve the Problems

An induction heating apparatus according to the invention includes a power factor correction circuit which corrects a power factor of an inputted direct-current power supply and supplies a smoothed output voltage to a first capacitor; a booster circuit which inputs the output voltage of the power factor correction circuit, and boosts and smoothes the output voltage of the power factor correction circuit to supply the boosted and smoothed output voltage to a second capacitor; an inverter circuit which inputs the output voltage of the booster circuit to generate a high-frequency current in a heating coil; a detection circuit which detects in driving the power factor correction circuit that the power factor correction circuit is in operation when the voltage at a predetermined portion in the booster circuit reaches a predetermined value, and detects that the power factor correction circuit is in non-operation when the voltage at the predetermined portion in the booster circuit does not reach the predetermined value; and an inverter control circuit which controls output of the inverter circuit such that an input current reaches a target value and suppresses or stops the output of the inverter circuit when the detection circuit detects that the power factor correction circuit is in non-operation.

The induction heating apparatus of the invention can control the output of the inverter circuit such that the input current reaches the target value, and can correct the power factor of the inverter. In the case where the power factor correction circuit becomes the non-operating state, the operation of the inverter is stopped. Therefore, the continuation of the heating with the decreased power factor or without obtaining the set output can be prevented.

The detection circuit may detect that the power factor correction circuit is in non-operation when the output voltage of the booster circuit does not reach a predetermined value. Because the output voltage of the booster circuit is boosted, the detection accuracy can be enhanced.

The power factor correction circuit may have a first choke coil which has an input terminal connected to a direct-current power supply and a first switching element which has a high-potential side terminal connected to an output terminal of the first choke coil. In that case, the first choke coil accumulates energy when the first switching element is turned on, and the first capacitor on an output side is supplied with the energy through a first diode when the first switching element is turned off. Therefore, the power factor of the direct-current power supply may be corrected by turning on and off the first switching element. The booster circuit may have a second choke coil connected to the output terminal of the power factor correction circuit, and a second switching element which has the high-potential side terminal connected to the output terminal of the second choke coil. In that case, the second choke coil accumulates energy when the second switching element is turned on, and the second capacitor on the output side is supplied with the energy through a second diode when the second switching element is turned off. Therefore, the voltage may be boosted larger than the output voltage of the power factor correction circuit by turning on and off the second switching element. The inverter control circuit for controlling the operation of the inverter circuit may have one microcomputer which is shared with a boost control circuit which controls the operation of the booster circuit, and the power factor correction circuit may be controlled by an IC for controlling drive of the power factor correction circuit which is different from the microcomputer. In order to enhance the power factor correction efficiency, it is necessary that the power factor correction circuit rapidly perform the turn-on and off operation of the switching element. The power factor correction circuit drive control IC is used to control the power factor correction circuit, so that the power factor correction circuit can be controlled while separated from the boost control circuit for controlling the operation of the booster circuit and the inverter control circuit for controlling the operation of the inverter circuit. Therefore, the power factor correction circuit can be configured inexpensively, with compact size, or easily. The boost control circuit and the inverter control circuit are formed by one microcomputer, so that the control circuit including the inverter control circuit can be simplified to reduce the cost. Even if the power factor correction circuit is operated while separated, it is detected that the power factor correction circuit is in non-operation by the microcomputer which is shared with the boost control circuit and the inverter control circuit, and the adverse influence which might be generated by the non-operation of the power factor correction circuit can be decreased.

An induction heating apparatus according to another aspect of the invention may include a power factor correction circuit which corrects a power factor of an inputted direct-current power supply and supplies a smoothed output voltage to a first capacitor; a booster circuit which inputs the output voltage of the power factor correction circuit and boosts and smoothes the output voltage of the power factor correction circuit to supply the boosted and smoothed output voltage to a second capacitor; an inverter circuit which inputs output of the booster circuit to generate a high-frequency current in a heating coil; a detection circuit which, in driving the power factor correction circuit, measures a gradient of an input current waveform of the inverter circuit, detects that the power factor correction circuit is in operation when a distortion of the input current waveform is lower than a predetermined distortion, and detects that the power factor correction circuit is non-operation when the distortion of the input current waveform is not lower than the predetermined distortion; and an inverter control circuit which controls output of the inverter circuit such that an input current reaches a target value, and which stops the output of the inverter circuit when the detection circuit detects that the power factor correction circuit is in non-operation.

The detection circuit may measure a gradient of an increasing input current at a predetermined phase of the input power supply in driving the power factor correction circuit in place of measuring the gradient of the input current waveform of the inverter circuit in driving the power factor correction circuit, and the detection circuit may detect that the power factor correction circuit is changed from the operation state to the non-operation state when the gradient is larger than a predetermined value. When the power factor correction circuit is changed from the operating state to the non-operating state while the inverter circuit is operated, the input current waveform becomes acute, and the value of the acute portion is instantaneously increased because the inverter circuit holds the output power. Therefore, the change to non-operating state of the power factor correction circuit can be detected.

An induction heating apparatus according to still another aspect of the invention may include a power factor correction circuit which corrects a power factor of an inputted direct-current power supply and supplies a smoothed output voltage to a first capacitor; a booster circuit which inputs the output voltage of the power factor correction circuit and boosts the output voltage of the power factor correction circuit to supply the boosted output voltage to a second capacitor; an inverter circuit which inputs the output voltage of the booster circuit to generate a high-frequency current in a heating coil; a detection circuit which, in driving the power factor correction circuit, compares a resonance voltage of the inverter circuit with an input current, detects that the power factor correction circuit is in operation when the resonance voltage is not lower than a predetermined ratio with respect to the input current, and detects that the power factor correction circuit is in non-operation when the resonance voltage is lower than the predetermined ratio; and an inverter control circuit which controls output of the inverter circuit such that the input current reaches a target value and stops the output of the inverter circuit when the detection circuit detects that the power factor correction circuit is in non-operation. The non-operation of the power factor correction circuit can be detected by measuring the voltage of the inverter circuit.

The induction heating apparatus of the invention may further include a display unit. When the detection circuit detects that the power factor correction circuit is in non-operation, contents of the non-operation may be displayed on the display unit. A user is encouraged to repair the power factor correction circuit by using the display unit. In the case where the inverter circuit is not stopped during failure, the inverter circuit can be used while the power factor correction circuit is repaired. Therefore, the usability is improved.

The inverter control circuit may decrease the output of the inverter circuit when the detection circuit detects that the power factor correction circuit is in non-operation. Therefore, in the non-operating state of the power factor correction circuit, the normal operation of the inverter circuit with the large heating output can be prevented. Because the inverter circuit is not stopped, the inverter circuit can be used while the power factor correction circuit is repaired, and thus the usability is improved.

The induction heating apparatus of the invention may further include a display unit. When the detection circuit detects that the power factor correction circuit is in non-operation, contents of the non-operation may be displayed on the display unit without stopping the inverter circuit. Because the inverter circuit is not stopped, the inverter circuit can be used while the power factor correction circuit is repaired. Therefore, the usability is improved.

EFFECTS OF THE INVENTION

According to the induction heating apparatus of the invention, the operation and non-operation of the power factor correction circuit can be detected on the output side of the power factor correction circuit. In the case where the power factor correction circuit is not operated, the output of the inverter circuit is stopped or suppressed, or information indicating that the power factor correction circuit is not operated is displayed or informed. Therefore, an influence on a power supply environment can be suppressed.

REFERENCE NUMERALS

Figure 1:
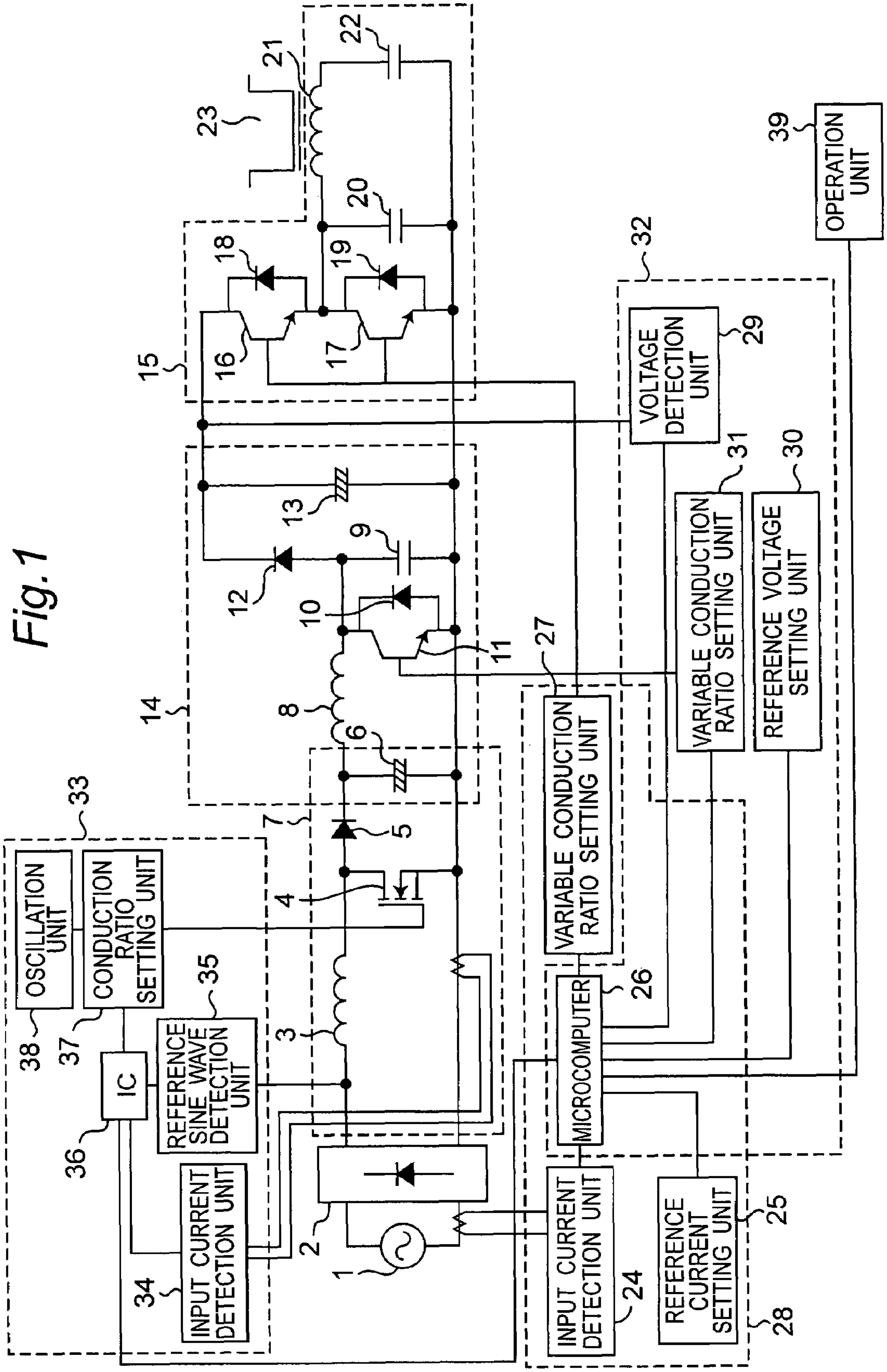
FIG. 1 is a circuit diagram showing an induction heating apparatus in an embodiment of the invention.

1 commercial power supply
2 rectifier circuit
3 choke coil
4, 11, 16, 17 switching element
5, 10, 12, 18, 19 diode
6, 13 smoothing capacitor
7 power factor correction circuit
8 choke coil
9, 20 snubber capacitor
14 booster circuit
15 inverter circuit
21 heating coil
22 resonant capacitor

23 object to be heated
24 input current detection unit
25 reference current setting unit
26 microcomputer
27 variable conduction ratio setting unit
28 inverter circuit drive control unit
29 voltage detection unit
30 reference voltage setting unit
31 variable conduction ratio setting unit
32 booster circuit drive control unit
33 power factor correction circuit drive control unit
34 input current detection unit
35 reference sine wave detection unit
36 IC
37 conduction ratio setting unit
38 oscillation unit
39 operation unit

BEST MODE FOR CARRYING OUT THE INVENTION

A preferred embodiment of the invention will be described below with reference to the drawings.

[Configuration of Induction Heating Apparatus]

FIG. 1 is a circuit diagram showing an induction heating apparatus in an embodiment of the invention. In FIG. 1, a commercial power supply 1 is a 200V commercial power supply which is a low-frequency alternating-current power supply. The induction heating apparatus of the embodiment includes a rectifier circuit 2 which has an input terminal connected to the commercial power supply 1 to rectify a voltage output from the commercial power supply 1, a power factor correction circuit 7 which inputs and boosts a direct-current power supply (which is pulsating flow in the embodiment) being of an output voltage of the rectifier circuit 2, corrects the power factor of the direct-current power supply, and supplies the smoothed output voltage to a smoothing capacitor 6 which is the first capacitor, a booster circuit 14 which inputs and boosts the output voltage of the power factor correction circuit 7 to supply the output voltage larger than the output voltage of the power factor correction circuit 7 to a smoothing capacitor 13 which is the second capacitor, and an inverter circuit 15 which inputs the output voltage of the booster circuit 14 to generate a high frequency current in a heating coil 21. The rectifier circuit 2 includes a bridge diode and an input filter.

The power factor correction circuit 7 includes a choke coil 3 which is the first choke coil, a switching element 4 (MOSFET in the embodiment) which is the first switching element, a diode 5 which is the first diode, and the smoothing capacitor 6. An input terminal of the choke coil 3 used for the power factor correction is connected to an output terminal on the high-potential side of the rectifier circuit 2 which is of the high-potential side of the direct-current power supply. A high-potential side terminal (drain) of the switching element 4 is connected to the output terminal of the choke coil 3, and a low-potential side terminal (source) of the switching element 4 is connected to the output terminal on the low-potential side of the rectifier circuit 2 which is of the low-potential side of the direct-current power supply. An anode of the diode 5 is connected to the high-potential side terminal of the switching element 4. A cathode of the diode 5 is connected to the high-potential side terminal of the smoothing capacitor 6. The low-potential side terminal of the smoothing capacitor 6 is connected to the low-potential side output terminal of the rectifier circuit 2. The power factor correction circuit 7 boosts the input voltage to an arbitrary voltage, and the power factor correction circuit 7 supplies the boosted voltage to the smoothing capacitor 6. In the embodiment, MOSFET having high switching speed is used as the switching element 4 to operate the power factor correction circuit 7 at a high frequency. Normally, a diode is connected to the MOSFET in inverse-parallel for the purpose of protection. However, the explanation of the operation is not affected by the protective diode even if the protective diode is eliminated, so that the protective diode is not described in FIG. 1.

The booster circuit 14 includes the smoothing capacitor 6, a choke coil 8 which is the second choke coil, a snubber capacitor 9, a diode 10, a switching element 11 (IGBT in the embodiment), a diode 12 which is of the second diode, and the smoothing capacitor 13. The input terminal of the choke coil 8 is connected to the high-potential side terminal of the smoothing capacitor 6. A high-potential side terminal (collector) of the switching element 11 is connected to the output terminal of the choke coil 8, and a low-potential side terminal (emitter) of the switching element 11 is connected to the low-potential side terminal of the smoothing capacitor 6. The snubber capacitor 9 is connected in parallel to the switching element 11, and the diode 10 is connected in inverse-parallel to the switching element 11. The anode of the diode 12 is connected to the high-potential side terminal of the switching element 11, and the cathode of the diode 12 is connected to the high-potential side terminal of the smoothing capacitor 13. The low-potential side terminal of the smoothing capacitor 13 is connected to the low-potential side terminal of the switching element 11. The voltage between the terminals of the smoothing capacitor 6 is inputted to the booster circuit 14, the booster circuit 14 supplies the voltage to the smoothing capacitor 13, and the smoothing capacitor 13 supplies the voltage to the inverter circuit 15.

The inverter circuit 15 includes switching elements 16 and 17 which are connected in series between the input terminals, diodes 18 and 19 which are connected in inverse-parallel to the switching elements 16 and 17 (that is, the high-potential side terminals (collectors) of the switching elements 16 and 17 are connected to the cathodes of the diodes 18 and 19, respectively), a snubber capacitor 20 which is connected in parallel to the switching element 17, and a series circuit which includes a heating coil 21 and a resonant capacitor 22 and which is connected in parallel to the switching elements 17. The input terminals of the inverter circuit 15 are connected to the output terminals of the booster circuit 14, that is, to the both ends of the smoothing capacitor 13. That is, the series-connected switching elements 16 and 17 are connected to both ends of the smoothing capacitor 13. The heating coil 21 is arranged while facing a pan 23 to be heated which is of the load. The series connection of the snubber capacitor 20, the heating coil 21, and the resonant capacitor 22 may be connected in parallel to the switching element 16.

The induction heating apparatus of the embodiment also includes an inverter circuit drive control unit 28, a booster circuit drive control unit 32, a power factor correction circuit drive control unit 33, and an operation unit 39.

The inverter circuit drive control unit 28 is an inverter control circuit which controls the inverter circuit 15. The inverter circuit drive control unit 28 includes an input current detection unit 24 which detects the input current of the induction heating apparatus, a reference current setting unit 25 which outputs a current reference value according to an input setting determined by operation contents of a user, a microcomputer 26, and a variable conduction ratio setting unit 27 which sets conduction ratios of the switching elements 16 and 17. The microcomputer 26 compares a signal outputted from the input current detection unit 24 with a signal outputted from the reference current setting unit 25 to output a signal to the variable conduction ratio setting unit 27 such that a predetermined input may be obtained. The variable conduction ratio setting unit 27 sets the conduction ratios of the switching elements 16 and 17 at a drive frequency set by the microcomputer 26 to perform the exclusive conduction control between the switching element 16 and the switching element 17. Thus, the inverter control circuit controls the output of the inverter circuit 15 such that the input current reaches the target value. The output control method is not limited to the method in which the variable conduction ratio is used. For example, a variable frequency may be used.

The booster circuit drive control unit 32 is a boost control circuit which controls the booster circuit 14. The booster circuit drive control unit 32 includes the microcomputer 26, a voltage detection unit 29 which detects the voltage of the smoothing capacitor 13 which is the input voltage of the inverter circuit 15, a reference voltage setting unit 30, and a variable conduction ratio setting unit 31 which sets the conduction ratio of the switching element 11. The microcomputer 26 compares the signal outputted from the voltage detection unit 29 with the voltage of the reference voltage setting unit 30 to output a signal to the variable conduction ratio setting unit 31 such that a predetermined voltage is obtained from the smoothing capacitor 13. The variable conduction ratio setting unit 31 sets the conduction ratio of the switching element 11 at the drive frequency set by the microcomputer 26 to perform the current-conduction control of the switching element 11. The microcomputer 26 is shared with the booster circuit drive control unit 32 and the inverter circuit drive control unit 28, which allows the circuit and control to be simplified.

The power factor correction circuit drive control unit 33 controls the drive of the switching element 4 in the power factor correction circuit 7. The power factor correction circuit drive control unit 33 includes an input current detection unit 34 which detects the input current of the induction heating apparatus, a reference sine wave detection unit 35 which detects the input voltage of the induction heating apparatus, a power factor correction circuit drive control IC 36, a conduction ratio setting unit 37 which sets the conduction ratio of the switching element 4, and an oscillation unit 38. The power factor correction circuit drive control IC 36 compares the output of the input current detection unit 34 with the output of the reference sine wave detection unit 35 to output the signal to the conduction ratio setting unit 37. The conduction ratio setting unit 37 sets the conduction ratio of the switching element 4 at the drive frequency set by the oscillation unit 38 such that the input current waveform may be equal to a reference sine wave voltage waveform outputted from the reference sine wave detection unit 35, and the conduction ratio setting unit 37 performs the conduction control of the switching element 4. The power factor correction circuit drive control IC 36 has a communication port which, with the microcomputer 26, is included in the inverter circuit drive control unit 28 and the booster circuit drive control unit 32. The microcomputer 26 can control the operation of the power factor correction circuit drive control IC 36 at arbitrary timing.

Thus, the microcomputer 26 is shared with the booster circuit drive control unit 32 which controls the operation of the booster circuit 14 and the inverter circuit drive control unit 28 which controls the operation of the inverter circuit 15, and the power factor correction circuit drive control unit 33 has the power factor correction circuit drive control IC 36 which is different from the microcomputer 26. Therefore, the power factor correction circuit 7 is controlled by the power factor correction circuit drive control IC 36 which is different from the microcomputer 26. It is necessary that the power factor correction circuit 7 rapidly perform the turn-on and turn-off operation of the switching element 4 to enhance the power factor correction effect. Because the power factor correction circuit drive control IC 36 is used in the induction heating apparatus of the embodiment, the power factor correction circuit 7 can be controlled independent from the booster circuit drive control unit 32 which controls the operation of the booster circuit 14 and the inverter circuit drive control unit 28 which controls the operation of the inverter circuit 15, which allows the low-cost, compact, or simple configuration of the power factor correction circuit 7. The microcomputer is shared with the booster circuit drive control unit 32 and the inverter circuit drive control unit 28, so that the control circuit including the inverter circuit drive control unit 28 can be simplified and the cost reduction can be achieved. Furthermore, even if the power factor correction circuit 7 is separately operated, the microcomputer 26 shared with the booster circuit drive control unit 32 and the inverter circuit drive control unit 28 detects that the power factor correction circuit 7 is in non-operation, and the adverse influence which might be generated by the non-operation of the power factor correction circuit 7 can be decreased.

The operation unit 39 transmits operation contents by a user to the microcomputer 26. The microcomputer 26 performs heating start, firepower adjustment, and heating stop based on the contents received from the operation unit 39.

[Operation of Induction Heating Apparatus]

Figure 2:
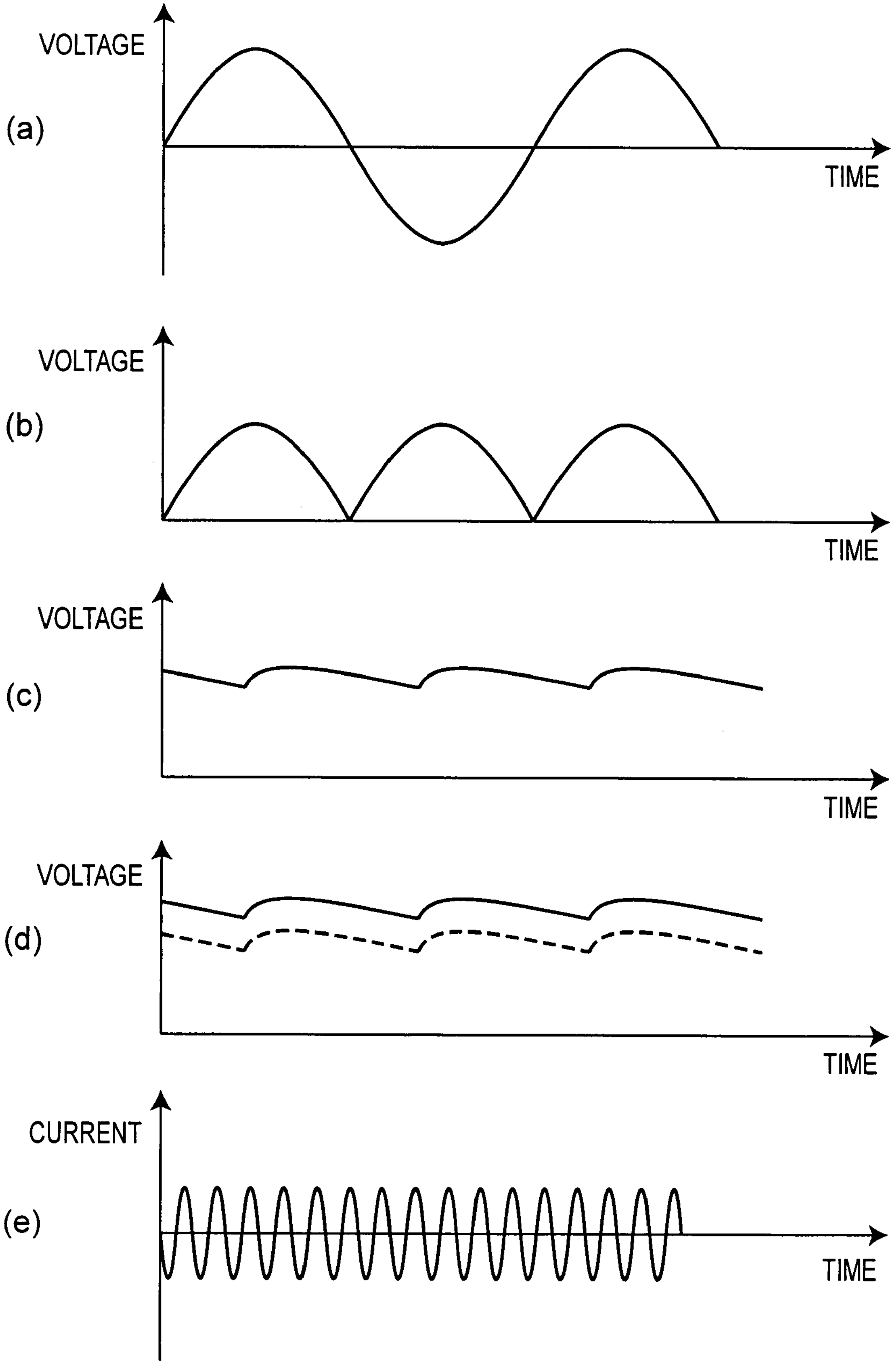
FIG. 2 is a voltage waveform chart of each unit of the induction heating apparatus in the embodiment of the invention.

The operation of the induction heating apparatus having the above-described configuration will be described below with reference to FIG. 2. FIG. 2(*a*) shows the voltage of the commercial power supply 1. FIG. 2(*b*) shows the input voltage of the power factor correction circuit 7, that is, the direct-current power supply which is of the output voltage of the rectifier circuit 2. FIG. 2(*c*) shows the voltage of the smoothing capacitor 6. FIG. 2(*d*) shows the voltage of the smoothing capacitor 13. FIG. 2(*e*) shows the high-frequency current outputted from the heating coil 21.

The voltage of the commercial power supply 1 shown in FIG. 2(*a*) is full-wave rectified by the rectifier circuit 2, and the voltage shown in FIG. 2(*b*) is supplied to the power factor correction circuit 3. When the voltage of the commercial power supply 1 is lower than the voltage of the smoothing capacitor 6, because the diode 5 included in the power factor correction circuit 3 and the bridge diode of the rectifier circuit 2 cannot be turned on, the input current waveform become distorted and the power factor is remarkably decreased. Therefore, the power factor correction circuit drive control unit 33 changes the output of the conduction ratio setting unit 37 such that the current waveform detected by the input current detection unit 34 is equalized to the detection waveform of the reference sine wave detection unit 35, and the power factor correction circuit drive control unit 33 turns-on and off the switching element 4. This enables the input current having the sine waveform to flow through the choke coil 3 from the commercial power supply 1, so that the distorted input current is prevented from flowing toward the side of the commercial power supply 1.

While the switching element 4 is turned on, energy from the commercial power supply 1 is accumulated in the choke coil 3. Then, when a current-conduction time set by the conduction ratio setting unit 37 elapses, the switching element 4 is turned off, and the energy accumulated in the choke coil 3 is supplied to the smoothing capacitor 6 through the diode 5.

Therefore, the voltage of the smoothing capacitor 6 becomes higher than the voltage of the commercial power supply 1. The voltage of the smoothing capacitor 6 is supplied to the inverter circuit 15 through the smoothing capacitor 13.

Thus, the power factor correction circuit 7 has the choke coil 3 of which the input terminal is connected to the direct-current power supply, and the switching element 4 having the high-potential side terminal which is connected to the output terminal of the choke coil 3. The energy is accumulated in the choke coil 3 by turning on the switching element 4, and the accumulated energy is supplied to the smoothing capacitor 6 through the diode 5 by turning off the switching element 4. Therefore, the power factor correction circuit 7 corrects the power factor of the direct-current power supply by turning on and off the switching element 4.

The booster circuit 14 accumulates the energy in the choke coil 8 while the switching element 11 is turned on. When the switching element 11 is turned off, the energy accumulated in the choke coil 8 is supplied to the smoothing capacitor 13 through the diode 12, and the smoothing capacitor 13 is charged.

Thus, the booster circuit 14 has the choke coil 8 which is connected to the output terminal of the power factor correction circuit 7, and the switching element 11 having the high-potential side terminal which is connected to the output end of the choke coil 8. The energy is accumulated in the choke coil 8 by turning on the switching element 11, and the accumulated energy is supplied to the smoothing capacitor 13 on the output side through the diode 12 by turning off the switching element 11. Therefore, the booster circuit 14 boosts the output voltage of the power factor correction circuit 7 so as to be larger by turning on and off the switching element 11.

In the embodiment, the voltage of the smoothing capacitor 13 is adjusted by varying the operation frequency and current conduction time of the switching element 11. Because the diode 10 which is of the inverse-current-conduction element and the snubber capacitor 9 are connected in parallel to the switching element 11, when the switching element 11 is turned off, the snubber capacitor 9 starts the charge with a gradient and the switching element 11 realizes a ZVS (Zero Voltage Switching) turn-off operation. The snubber capacitor 9 is fixed to the voltage equal to that of the smoothing capacitor 13 when the snubber capacitor 9 has the voltage equal to that of the smoothing capacitor 13 while the switching element 11 is turned off, and then the snubber capacitor 9 starts discharge when the voltage of the smoothing capacitor 13 is higher than the voltage of the snubber capacitor 9. When the snubber capacitor 9 completes the discharge, the diode 10 which is of the inverse-current-conduction element is turned on. The continuous drive mode, in which the switching element 11 is turned on within a predetermined time after the discharge is completed in the snubber capacitor 9, is adopted in the embodiment. However, there is no problem even if the switching element 11 is turned on since a predetermined time or more elapses after the discharge of the snubber capacitor 9 is completed. Although the switching element 11 can be turned on before the discharge of the snubber capacitor 9 is completed, the current passed through the choke coil 8 flows rapidly into the switching element 11, which results in the increase in loss. Therefore, in the embodiment, after the discharge of the snubber capacitor 9 is completed, the switching element 11 is turned on within the predetermined time.

The voltage of the smoothing capacitor 6 shown by a broken line of FIG. 2(*d*) which corresponds to the output of the power factor correction circuit 7 is boosted as shown by a solid line of FIG. 2(*d*) by the booster circuit 14, and the boosted voltage is supplied to the smoothing capacitor 13. The voltage of the smoothing capacitor 13 is adjusted such that the electric power which a user sets to the operation unit 39 is supplied to the object to be heated 23. Thus, the operation of the booster circuit 14 is described above.

The voltage of the smoothing capacitor 13 which is boosted by the booster circuit 14 is supplied to the inverter circuit 15. The inverter circuit 15 generates the high-frequency current having a predetermined frequency shown in FIG. 2(*e*) in the heating coil 21 by turning on and off the switching elements 16 and 17.

When the switching element 16 is turned off from on, because the snubber capacitor 20 is discharged with the gradient, the switching element 16 realizes the ZVS turn-off operation. When the discharge of the snubber capacitor 20 is fully completed, the diode 19 is turned on. When the on-signal is applied to the gate of the switching element 17 while the diode 19 is turned on, the diode 19 is turned off to generate commutation of the current to the switching element 17, and the switching element 17 realizes a ZVS and ZCS (Zero Current Switching) turn-off operation.

When the switching element 17 is turned off from on, because the snubber capacitor 20 is charged with the gradient, the switching element 17 realizes the ZVS turn-off operation. When the snubber capacitor 20 is charged to the voltage equal to that of the smoothing capacitor 13, the diode 18 is turned on. When the on-signal is applied to the gate of the switching element 16 while the diode 18 is turned on, the diode 18 is turned off to generate the commutation of the current to the switching element 16, and the switching element 16 realizes the ZVS and ZCS turn-on operation. Thus, the operation of the inverter circuit 15 is described above.

In the embodiment, when the switching elements 16 and 17 are alternately tuned on and off, an interval of a dead time of 2 μs is provided such that the smoothing capacitor 13 is not short. In the embodiment, the drive frequencies of the switching elements 16 and 17 are fixed, and the high-frequency power is controlled by changing the conduction time. The generation of the audible sound caused by a drive frequency difference between the booster circuit 14 and the inverter circuit 15 is suppressed by equalizing the drive frequencies of the booster circuit 14 and the inverter circuit 15 to each other. However, even if the drive frequency of the inverter circuit 15 is variable, the high-frequency power can be obviously controlled.

In the induction heating apparatus of the embodiment, when a user performs the heating start operation with the operation unit 39, the operation unit 39 outputs a heating start command to the microcomputer 26. The microcomputer 26 which receives the heating start command fixes the output with respect to the variable conduction ratio setting unit 27 to operate the inverter circuit 15 in a state in which the drive frequency and conduction time of the inverter circuit 15 are fixed in predetermined fluctuation ranges, and a kind of the pan which is of the load 23 is determined. Then, the microcomputer 26 outputs the operation start signal to the power factor correction circuit drive control IC 36, and the operation is performed such that the voltage of the smoothing capacitor 6 which is of the output of the power factor correction circuit 7 becomes the desired value. Then, the judgment of the kind of the pan is made by driving the booster circuit 14 according to the kind of the load.

[Detection of Operation/Non-Operation of Power Factor Correction Circuit]

In the embodiment, the voltage detection unit 29 and the microcomputer 26 constitute a detection circuit which detects the operation of the power factor correction circuit 7. The voltage detection unit 29 detects the voltage of the smoothing capacitor 13 which is of the output of the booster circuit 14 immediately before the booster circuit 14 is operated, that is, when the power factor correction circuit 7 is started up. When the signal of the voltage detection unit 29 becomes not lower than a specified value, the microcomputer 26 detects that the power factor correction circuit 7 is operated. When the signal of the voltage detection unit 29 is lower than the specified value, the microcomputer 26 detects that the power factor correction circuit 7 is in non-operation to stop the operation of the inverter circuit 15.

In order to correspond to recent growing recognition of the harmonic current regulation, the induction heating apparatus of the invention has the power factor correction circuit 7, the booster circuit 14, and the inverter circuit 15. In starting up the power factor correction circuit 7, the voltage of the smoothing capacitor 13 which is of the output voltage of the booster circuit 14 is detected, which allows the operation and the non-operation to be detected in the power factor correction circuit 7. When the non-operation is detected in the power factor correction circuit 7, the operation of the inverter circuit 15 can be stopped to prevent the continuation of the heating with the power factor decreased or without obtaining the setting output.

In the embodiment, the detection circuit including the voltage detection unit 29 and the microcomputer 26 detects the output voltage of the booster circuit 14 in starting up the power factor correction circuit 7 in order to detect the operation and non-operation of the power factor correction circuit 7. However, instead of the output voltage of the booster circuit 14, the detection circuit may detect any voltage as long as the voltage is the node voltage in the booster circuit 14 (voltage in a predetermined portion in the booster circuit 14).

In place of the output voltage of the booster circuit 14, the detection circuit may detect the gradient (change amount) of a change in instantaneous value at a predetermined phase associated with the distortion of the input current of the inverter 15 circuit or the distortion of waveform. That is, in driving the power factor correction circuit 7, the gradient of the input current waveform of the inverter circuit 15 is measured to obtain, for example, the acute waveform compared with the sine waveform. It is detected that the power factor correction circuit 7 is in operation when it is judged that the distortion of the waveform is lower than a predetermined distortion, and it is detected that the power factor correction circuit 7 is in non-operation when it is judged that the distortion of the waveform is not lower than the predetermined distortion. For example, the instantaneous value is measured in the determined phase of the input current waveform, and the gradient of the input current waveform can be determined by computing the instantaneous value with the microcomputer. When the waveform becomes the acute shape compared with the sine waveform, a peak value of the input current is instantaneously increased because the inverter circuit 15 maintains the output power. The operation of the power factor correction circuit 7 is detected when it is judged that the gradient (change amount) of the change in instantaneous value at the predetermined phase (for example, neighborhood of a peak phase) of the input power supply which can detect this instantaneous increase in input current is smaller than a predetermined value, and the non-operation of the power factor correction circuit 7 is detected when the distortion of the waveform is not lower than the predetermined distortion. Alternatively, both the gradient of the output voltage of the booster circuit 14 and the gradient of the input current of the inverter circuit 15 are detected, it may be judged that the power factor correction circuit 7 is operated when both the gradients are not lower than a predetermined value, and it maybe judged that the power factor correction circuit 7 is not operated when either of the gradients is lower than the predetermined value. The power factor correction circuit 7 is operated immediately before the inverter circuit 15 is started up, and the output voltage of the booster circuit 14 is detected while the operation of the booster circuit 14 is stopped. Therefore, the operation and non-operation can be detected in the power factor correction circuit 7. In the case where the power factor correction circuit 7 has a boosting function, when the output voltage of the booster circuit 14 is not lower than the predetermined voltage while the operation of the booster circuit 14 is stopped, it can be judged that the power factor correction circuit 7 is operated. On the other hand, the method of measuring the distortion of the input current waveform and the method of measuring the gradient of the change in instantaneous value or the change amount at the predetermined phase are useful to the detection of the change in power factor correction circuit 7 from the operation state to the non-operation state in driving the inverter circuit 15. In the method of measuring the output voltage of the booster circuit 14, due to the influence of the boosting function of the power factor correction circuit 7, it is difficult to accurately detect the change in power factor correction circuit 7 from the operation state to the non-operation state in driving the inverter circuit 15.

Alternatively, in place of or in addition to the detection of the distortion of the input current of the inverter circuit 15 or the detection the gradient (change amount) of the increasing input current at the predetermined phase associated with the distortion of the waveform, the resonance voltage of the resonant capacitor 22 and the input current may be detected. In such case, it maybe detected that the power factor correction circuit 7 is operated when the distortion of an integral waveform of the resonance voltage is not lower than a predetermined ratio with respect to the input current, and it may be detected that the power factor correction circuit 7 is not operated when the value of the resonance voltage is lower than the predetermined ratio. The non-operation of the power factor correction circuit 7 can be detected by measuring the voltage of the inverter circuit 15. This method is useful to the detection of the change in power factor correction circuit 7 from the operation state to the non-operation state in driving the inverter circuit 15 like the method of measuring the distortion of the input current waveform and the method of measuring the gradient of the change in instantaneous value or the change amount at the predetermined phase.

In the case where the non-operation of the power factor correction circuit 7 is detected to stop the inverter circuit 15, the contents about the non-operation of the power factor correction circuit 7 and the stop of the inverter circuit may be displayed on the operation unit 39. The induction heating apparatus of the embodiment may include a display unit different from the operation unit 39, and may display contents concerning the non-operation of the power factor correction circuit 7, for example, contents for encouraging a user to repair of failure of the power factor correction circuit 7 on the display unit when the inverter circuit 15 is stopped. In the case where the non-operation of the power factor correction circuit 7 is detected, the contents concerning the non-operation of the power factor correction circuit 7 may be displayed on the operation unit 39 or another display unit while the inverter circuit 15 is not stopped. The high-frequency current which is of the output of the inverter circuit 15 may be decreased when it is detected that the power factor correction circuit 7 is in non-operation.

The induction heating apparatus of the embodiment is useful to an induction heating cooking device, an induction heating copy roller, an induction heating type melting furnace, an induction heating jar rice cooker, and other induction heating type of heating devices.

Although the present invention has been described in connection with specified embodiments thereof, many other modifications, corrections and applications are apparent to those skilled in the art. Therefore, the present invention is not limited by the disclosure provided herein but limited only to the scope of the appended claims.

INDUSTRIAL APPLICABILITY

The induction heating apparatus of the invention can detect, on the output side of the power factor correction, that the power factor correction circuit is in operation or non-operation, and the induction heating apparatus is useful to the induction heating cooking device including the power factor correction circuit, the booster circuit, and the inverter circuit, and the like.

The invention claimed is:

1. An induction heating apparatus comprising:

a power factor correction circuit that corrects a power factor of an inputted direct-current power supply and supplies a smoothed output voltage to a first capacitor;

a booster circuit that inputs the output voltage of said power factor correction circuit, boosts and smoothes the output voltage of said power factor correction circuit, and supplies the boosted and smoothed output voltage to a second capacitor;

an inverter circuit that inputs the output voltage of said booster circuit to generate a high-frequency current in a heating coil;

a detection circuit that, in driving said power factor correction circuit, detects that said power factor correction circuit is in operation when a voltage at a predetermined portion in said booster circuit reaches a predetermined value, and detects that said power factor correction circuit is in non-operation when the voltage at the predetermined portion in said booster circuit does not reach the predetermined value; and an inverter control circuit that controls output of said inverter circuit such that an input current reaches a target value, and stops the output of said inverter circuit when said detection circuit detects that said power factor correction circuit is in non-operation.

2. The induction heating apparatus according to claim 1, wherein said detection circuit detects that said power factor correction circuit is in non-operation when the output voltage of said booster circuit does not reach a predetermined value.

3. The induction heating apparatus according to claim 1, wherein said power factor correction circuit includes a first choke coil having an input terminal connected to the direct-current power supply, and a first switching element having a high-potential side terminal connected to an output terminal of said first choke coil, energy being accumulated in said first choke coil when said first switching element is turned on, and being supplied to said first capacitor on an output side through a first diode when said first switching element is turned off, said power factor correction circuit correcting the power factor of said direct-current power supply by turning on and off said first switching element, said booster circuit includes a second choke coil connected to the output terminal of said power factor correction circuit, and a second switching element having a high-potential side terminal connected to the output terminal of said second choke coil, energy being accumulated in said second choke coil when said second switching element is turned on, and being supplied to said second capacitor on the output side through a second diode when said second switching element is turned off, said booster circuit boosting the output voltage of said power factor correction circuit by turning on and off said second switching element, said inverter control circuit for controlling the operation of said inverter circuit includes one microcomputer that is shared with a boost control circuit for controlling the operation of said booster circuit, and said power factor correction circuit is controlled by an IC for controlling drive of the power factor correction circuit which is different from said microcomputer.

4. The induction heating apparatus according to claim 1, further comprising a display unit, wherein contents of the non-operation are displayed on said display unit when said detection circuit detects that said power factor correction circuit is in non-operation.

5. The induction heating apparatus according to claim 1, further comprising a display unit, wherein contents of the non-operation are displayed on said display unit, in place of the stopping said inverter circuit when said detection circuit detects that said power factor correction circuit is in non-operation.

6. The induction heating apparatus according to claim 1, wherein said inverter control circuit decreases the output of said inverter circuit, in place of the stopping said inverter circuit when said detection circuit detects that the power factor correction circuit is in non-operation.

7. An induction heating apparatus comprising:

a power factor correction circuit that corrects a power factor of an inputted direct-current power supply and supplies a smoothed output voltage to a first capacitor;

a booster circuit that inputs the output voltage of said power factor correction circuit, boosts and smoothes the output voltage of said power factor correction circuit, and supplies the boosted and smoothed output voltage to a second capacitor;

an inverter circuit that inputs the output of said booster circuit to generate a high-frequency current in a heating coil;

a detection circuit that, in driving said power factor correction circuit, measures a gradient of an input current waveform of said inverter circuit, detects that said power factor correction circuit is in operation when a distortion of the input current waveform is lower than a predetermined distortion, and detects that said power factor correction circuit is in non-operation when the distortion of the input current waveform is not lower than the predetermined distortion; and an inverter control circuit that controls the output of said inverter circuit such that an input current reaches a target value, and stops the output of said inverter circuit when said detection circuit detects that said power factor correction circuit is in non-operation.

8. The induction heating apparatus according to claim 7, wherein said detection circuit measures a gradient of an increasing input current at a predetermined phase of said input power supply in driving said power factor correction circuit, in place of the measuring the gradient of the input current waveform of said inverter circuit, and said detection circuit detects that said power factor correction circuit in operation is changed to be in non-operation when the gradient is larger than a predetermined value.

9. The induction heating apparatus according to claim 7, further comprising a display unit, wherein contents of the non-operation are displayed on said display unit when said detection circuit detects that said power factor correction circuit is in non-operation.

10. The induction heating apparatus according to claim 7, further comprising a display unit, wherein contents of the non-operation are displayed on said display unit, in place of the stopping said inverter circuit when said detection circuit detects that said power factor correction circuit is in non-operation.

11. The induction heating apparatus according to claim 7, wherein said inverter control circuit decreases the output of said inverter circuit, in place of the stopping said inverter circuit when said detection circuit detects that the power factor correction circuit is in non-operation.

12. An induction heating apparatus comprising:

a power factor correction circuit that corrects a power factor of an inputted direct-current power supply and supplies a smoothed output voltage to a first capacitor;

a booster circuit that inputs the output voltage of said power factor correction circuit, boosts the output voltage of said power factor correction circuit and supplies the boosted output voltage to a second capacitor;

an inverter circuit that inputs the output voltage of said booster circuit to generate a high-frequency current in a heating coil;

a detection circuit that compares a resonance voltage of said inverter circuit with an input current in driving said power factor correction circuit, detects that said power factor correction circuit is in operation when said resonance voltage is not lower than a predetermined ratio with respect to said input current, and detects that said power factor correction circuit is in non-operation when said resonance voltage is lower than said predetermined ratio; and an inverter control circuit that controls the output of said inverter circuit such that said input current reaches a target value, and stops the output of said inverter circuit when said detection circuit detects that said power factor correction circuit is in non-operation.

13. The induction heating apparatus according to claim 12, further comprising a display unit, wherein contents of the non-operation are displayed on said display unit when said detection circuit detects that said power factor correction circuit is in non-operation.

14. The induction heating apparatus according to claim 12, further comprising a display unit, wherein contents of the non-operation are displayed on said display unit, in place of the stopping said inverter circuit when said detection circuit detects that said power factor correction circuit is in non-operation.

15. The induction heating apparatus according to claim 12, wherein said inverter control circuit decreases the output of said inverter circuit, in place of the stopping said inverter circuit when said detection circuit detects that the power factor correction circuit is in non-operation.

* * * * *